United States Patent
Aylward

[11] Patent Number: 6,106,267
[45] Date of Patent: Aug. 22, 2000

[54] APPARATUS FOR FORMING A COMPRESSION-MOLDED PRODUCT

[76] Inventor: John T. Aylward, 139 Trent Shores Dr., New Bern, N.C. 28562

[21] Appl. No.: 09/092,364

[22] Filed: Jun. 5, 1998

[51] Int. Cl.⁷ .................................................. B29C 43/32
[52] U.S. Cl. ........................................... 425/352; 425/469
[58] Field of Search .......................... 425/352, DIG. 228, 425/457, 469

[56] References Cited

U.S. PATENT DOCUMENTS

| | | | |
|---|---|---|---|
| 413,453 | 10/1889 | Mitchell | 83/148 |
| 3,196,485 | 7/1965 | Battenfeld et al. | 425/408 |
| 3,408,436 | 10/1968 | Cubitt . | |
| 3,534,440 | 10/1970 | Roberts | 249/103 |
| 3,887,685 | 6/1975 | Stelzmuller | 425/260 |
| 3,956,516 | 5/1976 | Holt et al. | 426/420 |
| 4,061,453 | 12/1977 | Desantis | 425/410 |
| 4,273,037 | 6/1981 | Ruebesam . | |
| 4,704,081 | 11/1987 | Puehler | 425/399 |
| 4,888,144 | 12/1989 | Matsushita et al. | 264/120 |
| 4,970,044 | 11/1990 | Kim et al. | 264/266 |
| 4,999,157 | 3/1991 | Nishio et al. | 419/68 |
| 5,269,997 | 12/1993 | Leslie | 264/320 |
| 5,407,339 | 4/1995 | Fehlhafer | 425/106 |
| 5,470,608 | 11/1995 | Watanabe et al. | 427/133 |
| 5,648,033 | 7/1997 | Bogue et al. | 264/109 |
| 5,653,926 | 8/1997 | Bogue et al. | 264/120 |
| 5,672,364 | 9/1997 | Kato et al. | 425/89 |
| 5,683,718 | 11/1997 | Errigo | 424/464 |

FOREIGN PATENT DOCUMENTS

| | | |
|---|---|---|
| 3-94999 | 4/1991 | Japan . |
| 81600 | 2/1955 | Netherlands . |
| 2276345 | 9/1994 | United Kingdom . |
| WO 96/00278 | 1/1996 | WIPO . |

*Primary Examiner*—Harold Pyon
*Assistant Examiner*—Donald Heckenberg
*Attorney, Agent, or Firm*—Alston & Bird LLP

[57] ABSTRACT

An apparatus for forming compression-molded products from powdered or granular material, such as tablets, includes a die having a cylindrical die cavity, and a pair of punches for compressing the material between opposing end faces of the punches within the die cavity. One or both of the punches is formed from a cylindrical punch body which is rigid, and a deformable tip attached to the working end of the punch body and made of an elastically deformable material such as rubber, urethane, silicone, or the like. The deformable tip facilitates release of a product from the punch.

2 Claims, 2 Drawing Sheets

APPARATUS FOR FORMING A COMPRESSION-MOLDED PRODUCT

FIELD OF THE INVENTION

The present invention relates to an apparatus for forming compression-molded products, particularly ingestible products such as medicinal tablets, candies, and the like, and to related methods for making such products.

BACKGROUND OF THE INVENTION

A variety of products are formed by compressing a loose granular or powder material into a cake, tablet, or other shape which has sufficient integrity to retain its compressed shape. For instance, in the preparation of pharmaceuticals taking the form of pressed tablets, an active ingredient is dispersed in a matrix or carrier such as glucose, sucrose, dextrose, polysaccharide, or the like, to form a loose powdered or granular feedstock. A selected quantity of the feedstock is deposited into a mold or die cavity, and a pair of punches, each having a recess or depression formed in its face in the negative image of one-half of a desired tablet shape, are brought together in the die cavity so as to compress the feedstock between the punches to form a tablet. Typically, one of the punches is then withdrawn from the die cavity through an open end thereof, and the tablet is removed from the die.

A persistent and vexing problem in the manufacture of compression-molded products is sticking of the compressed tablet to the punches. This can result in a number of undesirable consequences. For example, sticking can hinder removal of the product from the die. Furthermore, even if the product is successfully removed from the die, a portion of the outer surface of the product can remain adhered to a punch, resulting in a defect or "dimple" in the product.

A number of approaches have been used to reduce the sticking of product to the punches. For instance, a lubricant is sometimes added to the feedstock. Alternatively, a lubricant or release material is sometimes applied to the faces of the punches. While these approaches are somewhat effective in dealing with the sticking problem, they necessitate use of additional materials which represent added cost in the manufacturing operation.

Another problem associated with the tooling used for making compression-molded products is the building up of deposits of the feedstock material on the inner surface of the die over repeated uses. In many cases, the die must be cleaned frequently in order to prevent malfunctioning of the tooling caused by a build-up of feedstock, particularly with certain types of feedstock such as dextrose or the like. This need for frequent cleaning results in frequent downtime, thus decreasing manufacturing efficiency.

SUMMARY OF THE INVENTION

The present invention overcomes the problems with prior compression-molding apparatus as noted above, by providing tooling for a compression-molding press in which one or both of the punches are adapted to facilitate release of a product without the necessity of an additional lubricant or release material being repeatedly applied to the punches. The invention also provides, in an alternative preferred embodiment, tooling having one or both of the punches configured to provide automatic cleaning of the inner surface of the die.

To these ends, a preferred embodiment of the invention comprises tooling for a compression-molding press including a die having a die cavity therein, the die cavity defining an inner surface which is generally cylindrical and including an open end for introducing feedstock material into the die cavity. The tooling also includes first and second punches for positioning in opposing spaced relation within the die cavity so as to closely fit therein and define a product-forming space therebetween, each punch having an end face adapted to contact the feedstock material such that movement of the punches toward each other compresses feedstock material in the product-forming space to form a compression-molded product whose opposite surfaces conform to the end faces of the punches. At least one of the punches comprises a substantially rigid punch body and a tip portion which is attached to the punch body and which defines the end face of the punch. The tip portion is formed of an elastically deformable material so as to be capable of undergoing deformation while compressing the feedstock and returning to its original undeformed state when the punches are moved back apart. The resilient punch tip portion facilitates release of the product from the punch.

Preferably, the punch body has a generally cylindrical outer surface which defines a longitudinal axis of the punch, and the punch body further includes an end surface generally normal to the longitudinal axis, the end surface being contoured to generally correspond to a shape which is desired to be imparted to a product. The deformable tip portion of the first punch advantageously comprises a layer of the elastically deformable material which conforms to the end surface of the punch body. The layer of elastically deformable material may be adhered to the end surface of the punch body, such as by applying the material to the end surface of the punch body in a fluid state and subsequently treating it to solidify the material so as to adhere the material to the punch body. Alternatively, the deformable tip portion may be removably attached to the punch body. The deformable material may be any of a wide variety of resilient materials, including polymers or rubber.

In accordance with a further preferred embodiment of the invention, the deformable tip portion includes a resilient circumferential wiping ring formed thereon coaxial with the punch body, the wiping ring in a relaxed state extending radially outward to a diameter greater than the diameter of the inner surface of the die cavity. Thus, the wiping ring fits closely against and is biased into contact with the inner surface of the die cavity so as to wipe the inner surface upon axial movement of the punch within the die. The wiping ring reduces the buildup of feedstock deposits on the inner surface of the die.

According to yet another embodiment of the invention, the tip portion is embossed with a pattern for forming an imprint pattern in the surface of a product. Alternatively, the tip portion is imprinted with a pattern for forming an embossed pattern on the surface of a product. The invention thus facilitates elimination of additional manufacturing steps which are typically required for printing identifying indicia on compression-molded products such as pharmaceutical tablets, candies, and the like.

The invention thus provides unique tooling for making compression-molded products which allow for significant improvements in manufacturing efficiency and reduction in costs.

BRIEF DESCRIPTION OF THE DRAWINGS

The above and other features, objects, and advantages of the invention will become more apparent from the following description of certain preferred embodiments thereof, when taken in conjunction with the accompanying drawings in which:

FIG. 2 is a view similar to FIG. 1, showing the punches compressing the feedstock material to form a tablet or the like;

DETAILED DESCRIPTION OF THE DRAWINGS

Figure 1:
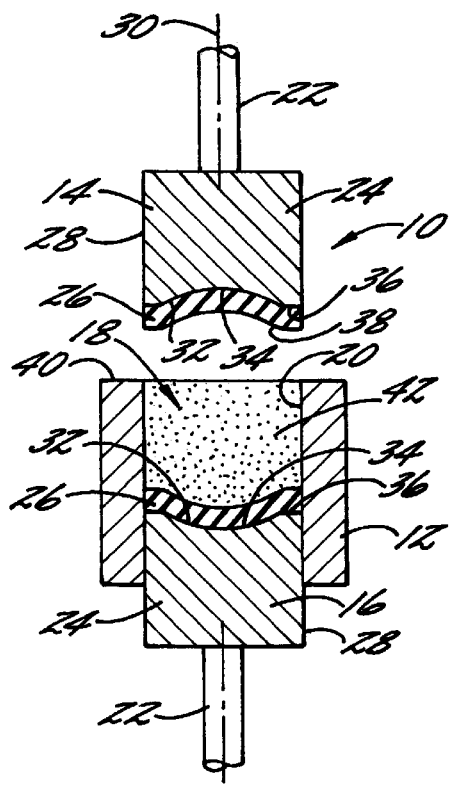
FIG. 1 is a sectioned side elevational view of a tooling set in accordance with a first preferred embodiment of the invention, showing a die filled with a measured quantity of feedstock material but before compression by the punches.

The invention is now explained by describing in detail certain preferred embodiments of the invention. It will be understood that these embodiments are not the only forms which the invention can take, and modifications and substitutions of equivalent elements or features can be made without departing from the scope of the invention.

With reference to FIGS. 1–4, a set of tooling 10 in accordance with the invention is depicted in a series of sequential views illustrating a typical manufacturing operation for making a compressed tablet or similar product. The tooling 10 comprises a die 12 and a pair of punches 14 and 16. The die 12 comprises a rigid member preferably constructed of metal such as steel, and having a die cavity 18 formed as a cylindrical bore extending through the die. The die cavity 18 has a cylindrical inner surface 20 which preferably is polished to a smooth surface finish to inhibit sticking of feedstock material thereto.

The punches 14 and 16 function to compress feedstock material within the die 12 so as to form a compressed product such as a tablet or the like. Each punch comprises a rigid shank 22 which is adapted to be removably secured to a reciprocatable element such as a ram (not shown) of a press (not shown), and further comprises a punch body 24, and an elastically deformable punch tip 26. The punch body 24 is a substantially rigid member preferably constructed of solid metal such as steel, and having a cylindrical outer surface 28 which is slightly smaller in diameter than the inner diameter of the die cavity inner surface 20 such that the punch is freely slidable within the die cavity 18 and the punch body 24 fits closely against the inner surface 20 of the cavity. The shank 22 is rigidly affixed to one end of the punch body 24 coaxially therewith so that the shank and punch body define a common longitudinal axis 30.

The end of the punch body 24 opposite from the end attached to the shank defines an end surface 32 which is generally normal to the longitudinal axis 30. The end surface 32 is contoured to correspond generally to a negative image of a desired contour to be formed on a surface of the tablet to be made. For example, the end surface 32 includes a depression or recess 34 formed centrally in the end surface and surrounded by an annular rim or land 36.

The elastically deformable punch tip 26 is attached to the working end of the punch body 24 and defines the end face 38 of the punch which contacts a feedstock material to compress the material into a tablet. The end face 38 is also contoured to correspond generally to the shape of the product surface desired to be made. Thus, for example, the punch tip 26 advantageously comprises a layer of elastically deformable material having a generally uniform thickness such that the end face 38 of the punch tip is substantially similar in contour to the end surface 32 of the punch body. The deformable tip 26 may be constructed of any suitable resiliently deformable material. Examples include natural rubber, silicone, urethane, and various others. Where an ingestible product is being made, the material of the tip 26 generally would be selected from among those materials which satisfy applicable government regulations prescribing allowable materials for contact with ingestible products.

A preferred material for the deformable tip 26 is urethane having a durometer hardness of about 70–90. The thickness of the layer of deformable material is preferably about 1 percent to 20 percent of the outer diameter of the punch body 24. However, the thickness of the layer of deformable material should generally be selected for the particular application in accordance with punch dimensions, the amount of compressive force exerted on the punch during use, the shape of the tablet to be made, the durometer hardness of the deformable material, as well as other factors.

The deformable tip 26 can be formed and attached to the punch body 24 in various ways. For instance, the tip 26 may be pre-formed by molding or casting a deformable material in the final shape of the tip, and then the tip may be adhered to the punch body by an adhesive material. Alternatively, the tip 26 may be molded or cast directly onto the end of the punch body 24 in accordance with known techniques for molding or casting, so as to form the final shape of the tip.

For example, in accordance with one method for making a punch with a deformable tip of the invention, a coating of an adhesive material is applied to the end surface 32 of the punch body 24 and the punch is then inserted into a mold configured to produce a suitably shaped tip on the end of the punch body. A curable liquid composition is then poured into the mold so that the composition covers the adhesive-carrying end surface of the punch, and the mold is subjected to a vacuum to remove air from the composition. The mold is placed in an oven to heat and cure the composition, and is then removed and allowed to cool and complete the curing of the composition. The resulting punch upon removal from the mold has a deformable tip attached to the punch body.

Other techniques may be used for attaching a deformable tip to a punch body. For example, the tip may be removably attached to the punch body by configuring the tip as a member which snaps onto the end of the punch body. The invention is not intended to be limited to any particular method of attaching the tip to the punch.

In use, the tooling 10 operates in the following manner. The die 12 is typically oriented in a vertical position and secured to a support surface (not shown). The lower punch 16 is affixed to a reciprocatable member of a press (not shown) so that the punch is vertically movable within the die cavity 18 and can be selectively positioned in various axial positions therein. Likewise, the upper punch 14 is affixed to another reciprocatable member of the press (not shown) so that it is vertically movable within the die cavity and selectively positionable therein, and is movable independently of the lower punch 16.

As shown in FIG. 1, the lower punch 16 is placed at an axial position within the die 12 which is selected such that a predetermined volume is defined between the end face 38 of the lower punch 16 and the open top end 40 of the die. The volume is selected in accordance with a desired mass of feedstock material to be formed into a tablet. The upper portion of the die cavity 18 is flood-filled with a loose powdered or granular feedstock material 42 so that the upper portion of the cavity is completely filled by the material.

Figure 2:
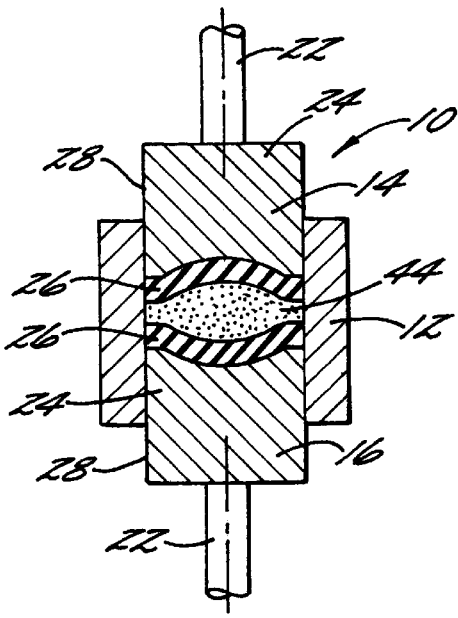

Next, as shown in FIG. 2, the upper punch 14 is axially advanced into the die cavity 18. The lower punch 16 is held stationary or, alternatively, is also axially advanced toward the upper punch 14. Thus, the feedstock material 42 is compressed between the end faces 32 of the punches. A selected degree of compression is performed in accordance with the desired density of the tablet to be made, so as to form a tablet 44.

Figure 3:
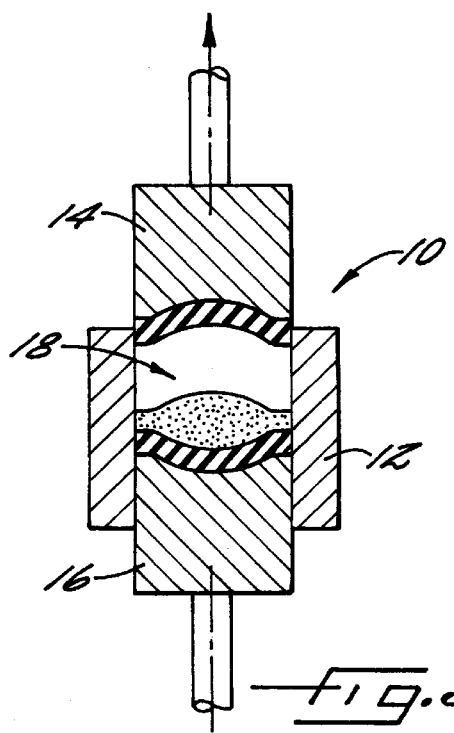
FIG. 3 is a view similar to FIGS. 1 and 2, showing one of the punches being retracted out the open end of the die.
Figure 4:
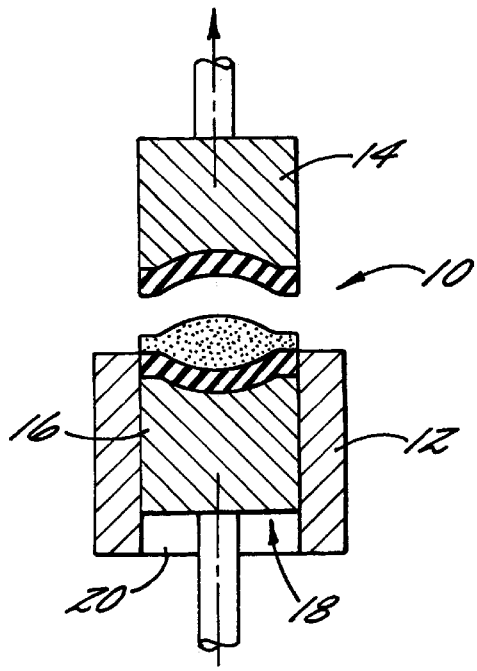
FIG. 4 is a view similar to FIGS. 1–3, showing the other punch extended to eject the completed tablet out the open end of the die.

The upper punch 14 is then retracted from the die 12 as shown in FIG. 3. Finally, the lower punch 16 is extended to push the tablet 44 to a position adjacent the open top end 40 of the die, where the tablet is removed by a device (not shown) which sweeps over the top of the die and pushes the tablet to a conveyor (not shown) for carrying the tablet to a subsequent work station for further processing, such as a coating station.

It will be appreciated that if the tablet 44 were to stick to either of the punches, the manufacturing process would not work as intended. For example, if the tablet were to stick to the upper punch 14 and were thus retracted along with the punch, the sweeper device described above might entirely miss the tablet, and the tablet might remain on the punch until the next manufacturing cycle, in which case the next cycle would malfunction because of the presence of the tablet. On the other hand, if the tablet were to stick to the lower punch 16, the sweeper device could become jammed. Thus, sticking of tablets to the punches of a tablet press is a significant problem.

It has been discovered that tablets are substantially less prone to stick to a punch having an elastically deformable tip in accordance with the invention. The precise physical phenomena at work are not well understood. However, although not wishing to be bound by theory, it is thought that the deformable tip 26 is compressed and deformed by contact with the feedstock material 42 as the material is compressed to form the tablet 44, and accordingly the tip 26 at the interface with the feedstock material deforms slightly. Then, when the compressive force on the punch is released, the tip 26 returns to its original undeformed shape, and a relative sliding motion occurs between the surface of the tablet 44, which is now substantially rigid, and the end face 32 of the tip 26. This relative sliding motion causes any stuck portions of the tablet surface to become unstuck, so that the tablet readily comes free of the tooling for conveyance to further processing stations.

Figure 5:
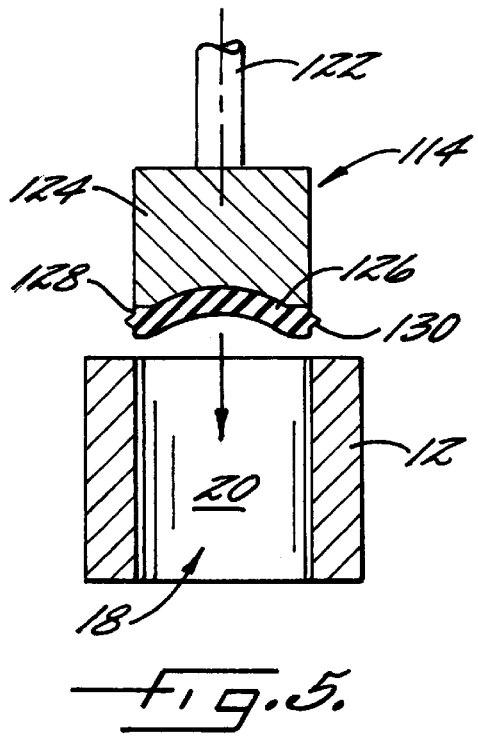
FIG. 5 is a view similar to FIG. 1, showing an alternative preferred embodiment of the invention in which the punch has a wiping ring formed on the deformable tip.

Another preferred embodiment of the invention is depicted in FIG. 5, which shows a punch 114 configured to provide a beneficial wiping action on the inner surface 20 of a die 12 so as to inhibit build-up of deposits of feedstock material on the inner surface. The punch 114 comprises a rigid punch body 124 attached to a shank 122, and a deformable punch tip 126 attached to the working end of the punch body. The deformable tip 126 is in most respects similar to the tip 26 previously described, with the exception of its outer peripheral surface 128 which confronts the inner surface 20 of the die. Specifically, the tip 126 is formed to have a wiping ring 130 on the outer peripheral surface 128 which extends circumferentially around the peripheral surface and projects radially outward to a maximum outer diameter which is slightly greater than the diameter of the inner surface 20 of the die 12 when the wiping ring 130 is in a relaxed undeformed state. When the punch 114 is inserted into the die cavity 18, the wiping ring 130 is radially compressed by the die so that a tight fit exists between the inner surface 20 and the wiping ring. Thus, axial extension and retraction of the punch 114 within the die 12 causes a wiping of the inner surface 20 by the wiping ring 130.

Figure 6:
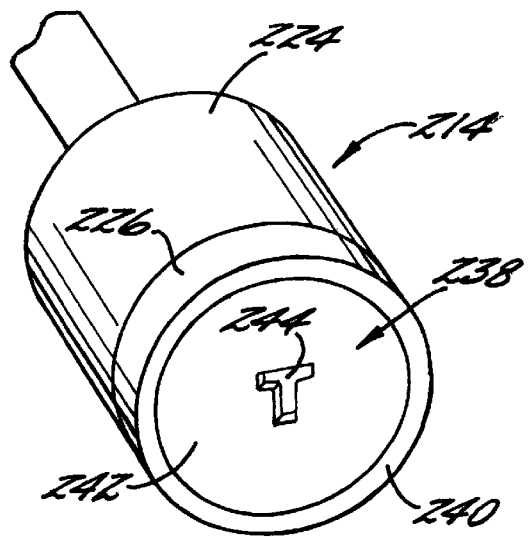
FIG. 6 is a perspective view of a punch in accordance with yet another preferred embodiment of the invention having a raised pattern on the deformable tip for forming an imprinted pattern on a tablet.

Still another preferred embodiment of the invention is depicted in FIG. 6. A punch 214 is shown which includes a punch body 224 and a deformable tip 226. The deformable tip 226 has an end face 238 which includes a planar annular land 240 surrounding a circular depressed or recessed surface 242 and which defines the tablet contour desired to be produced. A raised or embossed pattern or indicia 244 is formed on the recessed surface 242. The pattern 244 forms a corresponding depressed or imprinted pattern in the outer surface of a tablet, and the deformability of the tip 226 prevents sticking of the pattern to the tablet. Alternatively, the pattern on the surface of the tip 226 may be a depressed or imprinted pattern which forms a raised or embossed pattern on the tablet surface.

It should be noted that although the various embodiments illustrated herein have punches formed as circular cylinders for forming tablets that are circular, the invention is not limited to tooling for forming circular products, and oval, oblong, and other shapes are encompassed within the invention. Throughout the specification and claims, the term "cylindrical" is used in the most general sense as denoting a surface produced by translating a closed planar curve (such as a circle, ellipse, oval, square, or the like) along a straight line which does not lie in the plane of the curve.

While the invention has been explained by reference to certain preferred embodiments, which have been described in considerable detail, the invention is not limited to the details which have been described. Various modifications and substitutions of equivalents may be made within the scope of the invention as set forth in the following claims.

What is claimed is:

1. Tooling for a press for making an ingestible compression molded product such as a pharmaceutical tablet from a granular feedstock material, and comprising:

a die having a die cavity therein, the die cavity defining an inner surface which is generally cylindrical, the die including an open end for introducing feedstock material into the die cavity;

first and second punches for positioning in opposing spaced relation within the die cavity so as to closely fit therein and define a product-forming space therebetween, each punch having an end face adapted to contact the feedstock material such that the movement of the punches toward each other compresses the feedstock material in the product-forming space to form a compression-molded product whose opposing surfaces conform to the end faces of the punches; and a first of the punches comprising a substantially rigid punch body and a tip portion which is attached to the punch body and which defines the end face of the punch, the tip portion being formed of an elastically deformable material so as to be capable of undergoing deformation while compressing the feedstock and returning to its original undeformed state when the punches are moved back apart;

wherein the deformable tip portion includes a resilient circumferential wiping ring formed thereon coaxial with the punch body, the wiping ring in a relaxed state extending radially outward to a diameter greater than the diameter of the inner surface of the die cavity, whereby the wiping ring fits closely against and is biased into contact with the inner surface of the die cavity so as to wipe the inner surface upon axial movement of the punch within the die.

2. A punch for compression-molding press of the type for molding an ingestible product such as a pharmaceutical tablet by compressing a powdered or granular feedstock between two punches with a die cavity of a die, the punch comprising:

a shank having opposite ends and defining a longitudinal axis;

a punch body attached to one end of the shank, the punch body being substantially rigid and having a generally cylindrical outer surface generally coaxial with the shank and an end surface generally normal to the longitudinal axis, the end surface being contoured to correspond generally to a shape which is desired to be imparted to a product; and an elastically deformable tip attached to the punch body and covering the end surface thereof, the tip generally conforming to the end surface so as to define an end face of the punch adapted to contact and compress feedstock material and impart a desired shape thereto;

wherein the deformable tip includes a resilient circumferential wiping ring formed thereon coaxial with the punch body, the wiping ring in a relaxed state extending radially outward to a diameter greater than the diameter of the inner surface of the die cavity, whereby the wiping ring fits closely against and is biased into contact with the inner surface of the die cavity so as to wipe the inner surface upon axial movement of the punch within the die.

\* \* \* \* \*